US009530263B1

(12) United States Patent
Daniel

(10) Patent No.: US 9,530,263 B1
(45) Date of Patent: Dec. 27, 2016

(54) SYSTEM AND METHOD OF VERIFICATION OF ACCESS USING A WEARABLE SECURITY DEVICE

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 154 days.

(21) Appl. No.: 14/450,006

(22) Filed: Aug. 1, 2014

Related U.S. Application Data

(60) Provisional application No. 61/861,260, filed on Aug. 1, 2013.

(51) Int. Cl.

| | |
|---|---|
| ***G06K 9/00*** | (2006.01) |
| ***G06K 15/00*** | (2006.01) |
| ***G05B 19/00*** | (2006.01) |
| ***H04L 9/32*** | (2006.01) |
| ***G09G 3/32*** | (2016.01) |
| ***G07C 9/00*** | (2006.01) |
| ***G06K 9/62*** | (2006.01) |

(52) U.S. Cl.
CPC ......... *G07C 9/00174* (2013.01); *G06K 9/6217* (2013.01)

(58) Field of Classification Search
CPC .......... G06K 9/00; G06K 15/00; G05B 19/00; H04L 9/32; G04Q 5/22; G09G 3/32
USPC .... 340/5.6, 5.7, 10.1; 345/2.3, 2.1; 382/115, 382/118; 235/375, 385
See application file for complete search history.

(56) References Cited

U.S. PATENT DOCUMENTS

| | | | | | |
|---|---|---|---|---|---|
| 4,476,381 | A * | 10/1984 | Rubin | B01L 3/5453 | 235/375 |
| 6,031,532 | A * | 2/2000 | Gourdol | G06F 3/04817 | 345/629 |
| 6,122,403 | A * | 9/2000 | Rhoads | G06F 17/30876 | 382/233 |
| 6,346,886 | B1 * | 2/2002 | De La Huerga | A61J 1/035 | 340/3.1 |
| 6,394,356 | B1 * | 5/2002 | Zagami | G07C 9/00079 | 235/382 |
| 6,809,646 | B1 * | 10/2004 | Lee | G06K 19/07749 | 235/487 |
| 7,076,083 | B2 * | 7/2006 | Blazey | G07C 9/00007 | 340/10.1 |
| 7,239,723 | B1 * | 7/2007 | Al-Sheikh | G07C 9/00079 | 382/115 |
| 7,724,207 | B2 * | 5/2010 | Mooney | G07C 9/00119 | 345/2.1 |
| 8,905,304 | B1 * | 12/2014 | Daniel | G06K 5/00 | 235/380 |
| 9,120,013 | B1 * | 9/2015 | Daniel | G07F 17/326 | |

(Continued)

*Primary Examiner* — Nam V Nguyen
(74) *Attorney, Agent, or Firm* — Carol N. Green Kaul, Esq.

(57) ABSTRACT

The present invention relates generally to a system and method of verification for access within site access areas using a wearable security device that includes one or more scannable frames displayed on the security device's exterior, wherein the wearer's identification information and assigned access for access to varied site access areas are electronically stored within the at least one scannable frame as embedded security clearance in multimedia format, which is verifiable when the at least one scannable frame is scanned by at least one image scanning device so that authorization to navigate within the premises is seamless within areas of authorized access while still allowing security to contain an individual in unauthorized locations.

21 Claims, 5 Drawing Sheets

(56) References Cited

U.S. PATENT DOCUMENTS

| | | | | |
|---|---|---|---|---|
| 2008/0052522 | A1* | 2/2008 | McArdle | H04L 9/3234 713/182 |
| 2009/0174633 | A1* | 7/2009 | Kumhyr | G09F 3/0294 345/82 |
| 2014/0266590 | A1* | 9/2014 | Guillaud | G07C 9/00119 340/5.65 |

* cited by examiner

300

SYSTEM AND METHOD OF VERIFICATION OF ACCESS USING A WEARABLE SECURITY DEVICE

PRIORITY CLAIM

This patent application is a Non-Provisional patent application and claims priority under 35 U.S.C. §119(e) to U.S. Provisional Patent Application Ser. No. 61/861,260, titled "System And Method Of Verification Of Access Within A Premises" filed Aug. 1, 2013. The entire disclosure of the afore-mentioned patent application is incorporated by reference as if fully stated herein.

FIELD OF THE INVENTION

The present invention relates generally to a system and method of verification for access within site access areas using a wearable security device that includes one or more scannable frames displayed on the security device's exterior, wherein the wearer's identification information and assigned access for access to varied site access areas are electronically stored within the at least one scannable frame as embedded security clearance in multimedia format, which is verifiable when the at least one scannable frame is scanned by at least one image scanning device so that authorization to navigate within the premises is seamless within areas of authorized access while still allowing security to contain an individual in unauthorized locations.

DESCRIPTION OF THE PRIOR ART

In the past, hospital security had a tendency to be more lenient for visitors as they were very cognizant of the emotional distress associated with visiting loved ones who are ill and in need of around the clock hospital care. As such, visitors were generally granted free access to roam the premises wandering from one ward to the next without much regard for boundaries, the patients involved or potential cordoned off areas. In some cases, wandering was inadvertent, while in other instances it allows for kidnapping to occur, especially of infants.

Currently hospitals require visitors to register with a patient and visitor tracking systems where they record visitor's information as well as the date and time of the visit and the identity of the patient being visited. However, once the visitor leaves the information/security desk, security has little or no means of tracking or knowing the visitor's whereabouts after access has been granted. Thus, there is a need for more efficient means of verifying access, and/or containing visitors or employees alike within authorized areas. This invention satisfies these long felt needs in a new and novel manner and solves the foregoing problems that the prior art has been unable to resolve.

For a further and more fully detailed understanding of the present invention, various objects and advantages thereof, reference is made to the following detailed description and the accompanying drawings.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

SUMMARY OF THE INVENTION

The present invention comprises of an apparatus, system and method, specifically an encoded wristband, assigned to visitors, whereby upon entering the hospital, visitors are required to provide their identification information, e.g. driver's license, passport or the like, and identify the patient being visited. Since each patient is registered with the hospital and is assigned a patient number at admission, the patient's number is linked to a specific ward and room number and therefore will correspond to the authorized site access areas that the patient's visitor will be allowed to navigate while on the premises.

The visitor's identification information and the corresponding patient's information may be stored as a scannable frame reference on the wearable security device, e.g. a wristband. The wristband is intended to be worn on the wrist or at least in a visible location for external viewing so that image scanning devices, e.g. cameras, that are strategically mounted at or near access points, i.e. exists and entrances to the various wards, can unobtrusively scan the scannable frames on the wristband to access the embedded information stored thereon to determine if the visitor has access to that particular ward or location as certain wards may be limited for health reasons to close relatives only. For example, in some hospitals, their Neonatal Intensive Care Unit ("NICU") visiting access is limited to the parents of the newborns only. To that extent, the visiting parent may have liberal access to the NICU but may be restricted from wandering freely in another ward, e.g. infectious diseases. For the visitor's safety and the NICU patient's health, it's in the hospital's best interest to limit the visiting parent's access to other wards and confine access to locations at or near the NICU ward.

In an exemplary embodiment of the invention, upon entering the hospital facility, the visiting parent of the NICU patient would be required to provide identification documentation verifying his/her identity as well as the patient's name. Once verified, the visiting parent is assigned a wristband with his/her identification information coded thereon as well as the patient's information, which is used to determine the site access areas that the visiting parent will be authorized to access within the hospital. Image scanning devices are strategically mounted at or near entrances and/or exits to different wards to allow seamless traverse of the premises as in some embodiments the wearer will not be required to stop at a station for the scannable frame to be scanned (or read) because the information stored on the wristband in the scannable frames are remotely accessible by using the image scanning devices. The image scanning devices scans the scannable frames on the wristband when the wearer is within a certain proximity to the image scanning device and accesses the embedded security clearance 108 information stored thereon to verify for example, the security clearance 108, patient's information; confirm identities of the wearer with the image accessed from the scannable frame to verify wearer's authorization for access at the present location.

If the visiting parent is within an authorized zone of access, the entrance and exit doors will automatically provide access to authorized locations without the visiting parent having to take any overt steps to gain access, e.g. breaking stride as they may be electronically controlled to open at a set time prior to wearer's approach. However, if the information scanned from the wristband fails to match the information provided or the location authorized, an alarm may be triggered to security personnel who may contain the visiting parent to a particular location or follow procedures to further authenticate the visiting parent's access or relocate him/her to a safe authorized location. Alternatively, if the wearer should've received authorization for his/her present location, instead of sounding an alarm the security clearance 108 stored on the wristband may be swapped out, updated and re-stored as embedded information on the wristband without the wearer even knowing or having to return to the security desk and/or replace the wristband.

It is understood that although the wearable security device has been described in conjunction with enclosed premises it is not restricted to the indoors but may be implemented in open spaces as well with image scanning devices to capture the scannable frames and access the embedded information stored within.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1:
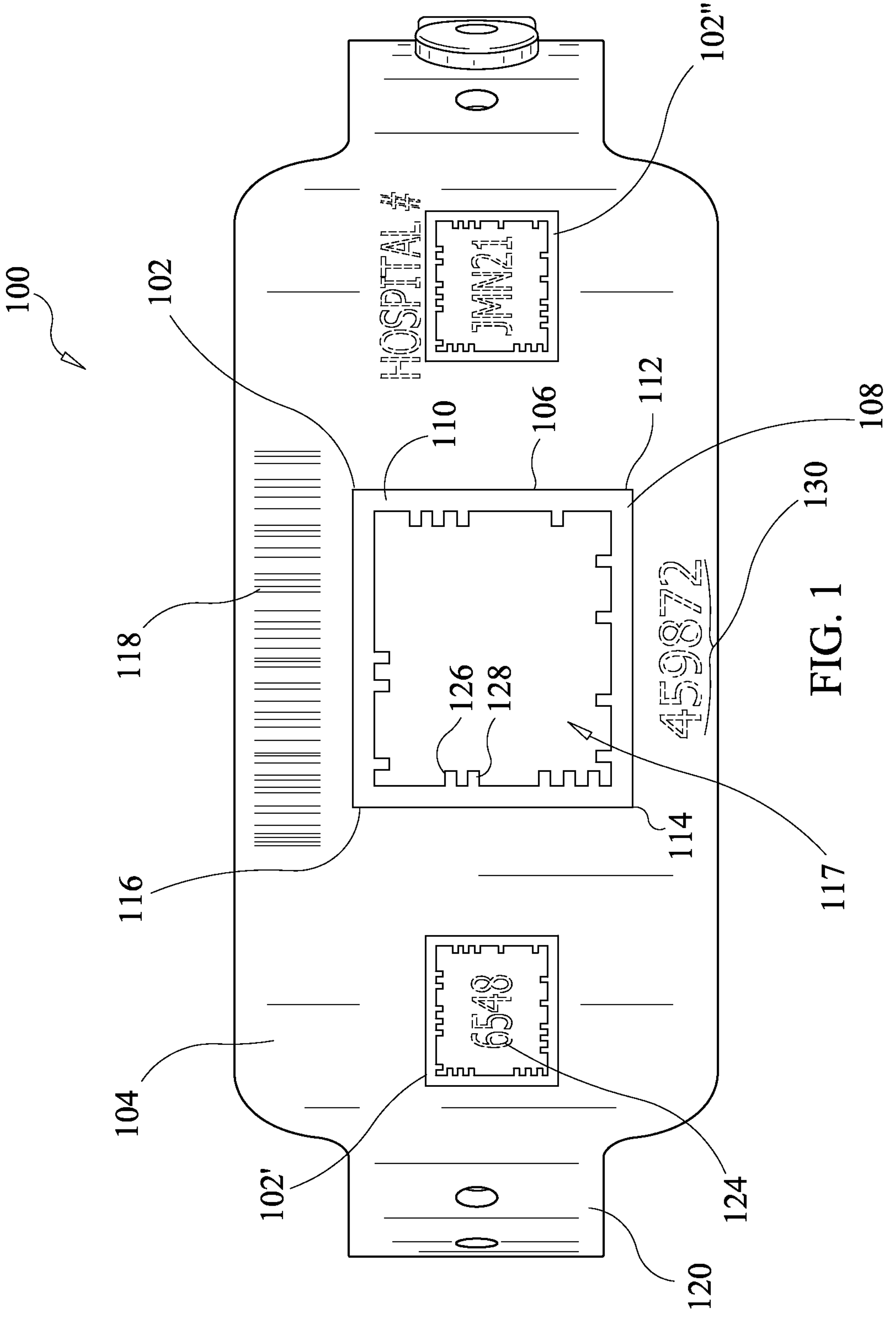
FIG. 1 is an exemplary embodiment of an apparatus of the invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus & Systems FIG. 1 is an exemplary embodiment of an apparatus 100 of the invention. The apparatus 100 comprises of a wearable security device 100, e.g. a wristband 100, that includes at least one or more scannable frames 102, 102' 102" displayed on the wearable security device's exterior 104, wherein the wearer's identification information 106 and security clearance 108 for access to varied site access areas are stored as interactive multimedia content within the at least one or more scannable frames 102, 102' 102" that includes at least one or more hot corners 110, 112, 114, 116 with at least one hyperlink or icon embedded within as embedded security clearance 108, which is verifiable when the at least one or more scannable frames 102, 102' 102" are scanned by at least one image scanning device 110 and the embedded security clearance 108 is controlled by control commands associated with the at least one hyperlink or icon embedded within the at least one hot corner 110.

Security clearance 108 as used herein comprises of any one or more of the following: name, address, and driver's license information. The security clearance 108 is embedded within the scannable frame and as such may be replaceable so that the wearable device is reusable for other wearers and the storage of other wearer's identification information and assigned access to be stored thereon. Security clearance 108 is stored on the wristband in multimedia format as embedded interactive multimedia content that includes of any one or more of the following: text, pictorial, video, audio, or graphics, or any combination thereof. The security clearance 108 is swappable where the current embedded interactive multimedia content can be replaced with the updated security clearance 108 that is stored within the scannable frame 102 on the wearable security device's exterior 104 without requiring wearer to remove or replace the wearable security device 100. Security clearance 108 may also be controlled by utilizing at least one control command associated with the at least one hyperlink or icon embedded within the scannable frame 102. Controlling the security clearance 108 may include but is not limited to increasing or reducing the security clearance 108 or other updating procedures.

The wristband 100 is of the type and composition generally used for identifying hospital patients. The wristband 100 is available in a variety of different sizes to accommodate visitors' wrists that are as small as newborns and as large as obese adults. Wristband 100 may be embossed, laser-printed or thermal-imaged with names, pictures, logo(s), barcode(s) 118 and other indicia of identification. In some embodiments, the wristband 100 is strong, flexible and reusable as it is constructed of plastic or non-toxic PVC film providing flexibility and strength. Wristband 100 comprises of a thin band 120 with closing means 122 (not shown) that may be positioned on opposing ends of the wristband 100. Closing means 122 (not shown) that may include but is not limited to snaps and fasteners, VELCRO®, a self-adhesive strip and other like closing means 122 (not shown) that are well known and used in the arts.

The wristband 100 is configured with at least one or more scannable frames 102, 102', 102" for storing thereon any one or more of the following registered information 124, wearer's identification information 106, and security clearance 108 and the like. Registered information 124 may include but is not limited to: patient, employee, building or hospital information, and the like where patient or employee information may include but is not limited to patient's or employee's name, and name of the ward, which may be embodied in a patient number assigned upon admission. Wearer's identification information 106 as used herein includes but is not limited to any one or more of the following: wearer's photograph or image, name, address, driver's license number, age, relationship to patient, or any other identification information for the wearer and the like. In some embodiments, visitor may be assigned a visitor's identification number for ease of reference. Hospital information may include for example the name of the hospital or in some cases the hospital might assign itself a hospital number such that a visitor from another hospital cannot use the same wristband 100 to gain access to a specific ward using an encoded wristband 100 that may be identical in outward appearances, but the information stored thereon in the scannable frame 102, e.g. the hospital name and/or number would differ and would be unrecognizable to the system 200 of the invention.

As shown, the scannable frames 102, 102', 102" include additional markings 126, 128 that outline each frame 102, such that there is a visual indicator to a casual observer that there is more to the frame 102 than displayed. In some embodiments the wristband 100 is reusable and as such contain minimum indicia of identification, e.g. may include the hospital's name printed thereon but at least one or more scannable frames 102, 102' may be displayed without images within the scannable frame 102 so that they may be used for other affiliate hospitals or departments and the like. In some embodiments, the scannable frames 102, 102', 102" may include printed words and/or images that may be pre-printed or upon issuance to the visitor and include relevant hospital information, visitor's identification information 106 and/or patient's information, wherein such information may be related to the wearer's assigned site access areas. In some embodiments, when the wristband 100 is issued it may contain an image of the wearer within a scannable frame 102.

Scannable frames 102, 102', 102" may be in any shape or other configuration, e.g. circular, oblong, triangle, a blob, a fish, an avatar, and the like. The scannable frame 102 includes at least one or more hot corners 110, 112, 114, 116 with at least one or more hyperlinks or icons embedded within, as displayed on the wristband 102. The scannable frame 102 includes interactive embedded multimedia content that is stored within and is retrievable when scanned by image scanning device 210 (as shown in FIG. 2), which activates for display the embedded hyperlinks or icons in the at least one hot corner of the scannable frame 102 on displaying means, for controlling the security clearance 108 information stored thereon.

For example, the when the one or more scannable frames 102, 102, 102" are scanned it activates for display the embedded at least one hyperlink or icon in the at least one hot corner of the scannable frame 102 and security personnel may manipulate the multimedia content stored associated with the scannable frame 102 and/or image by engaging the at least one hyperlink or icon for accessing and controlling the multimedia content and using at least one control command associated with the at least one hyperlink or icon by overlaying a display area 117 within the scannable frame 102 with the at least one hyperlink or icon and controlling the multimedia content pursuant to a control command associated with the at least one icon or hyperlink in the at least one hot corner. In some embodiments, the multimedia content is displayed on a networked communication device's displaying means, e.g. a computer monitoring screen, or other displaying means that are well known and used in the arts. In some embodiments, the at least one multimedia content is displayed within the scannable frame 102, 102' with full functionality for review and control using the control command Each wristband 100 issued may be assigned a wristband number 130, which acts as a unique identifier allows the system to uniquely recognize and register each wristband 100 that has been assigned and issued to individual wearers. Wristband number 130 may be assigned by a random number generating program, comprising of numerals, characters, alphanumeric characters or any other unique identifiers that are known and used in the arts that may be pre-printed thereon by the manufacturer or printed upon issuance. Prior to being issued, the wristband number 130 may be recorded with the system as yet another means of identifying the visitor to which it is assigned. Each wristband 100 may store thereon a validation date as a barcode 114, i.e. an issue date and/or time that corresponds to the date the wristband 100 was issued to the visitor and the expiration date and/or time, which may correspond to, for instance, visiting hours for the ward.

Figure 2:
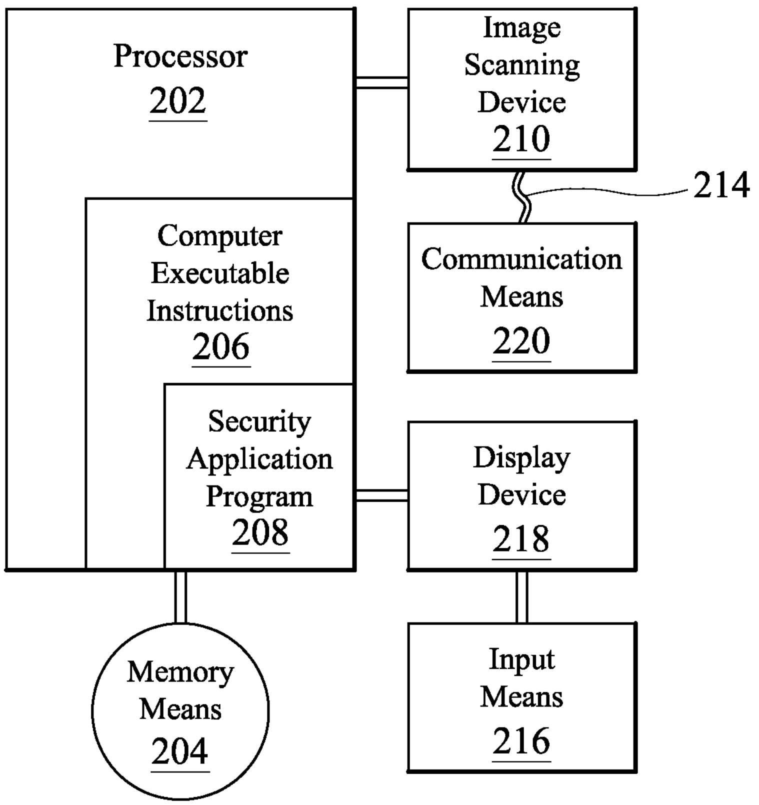
FIG. 2 is an exemplary embodiment of the system of the invention.

FIG. 2 is an exemplary embodiment of the system 200 of the invention. System 200 includes the wearable security device 100, e.g. a wristband 100, that includes at least one or more scannable frames 102, 102' 102" displayed on the wearable security device's exterior 104, wherein the wearer's identification information 106 and security clearance 108 for access to varied site access areas are stored as interactive multimedia content within the at least one or more scannable frames 102, 102' 102" that includes at least one or more hot corners 110, 112, 114, 116 with at least one hyperlink or icon embedded within as embedded security clearance 108, which is verifiable when the at least one or more scannable frames 102, 102' 102" are scanned by at least one image scanning device 110 and the embedded security clearance 108 is controlled by control commands associated with the at least one hyperlink or icon embedded within the at least one hot corner 110.

System 200 further comprises of an image scanning device 210 for scanning the embedded security clearance 108 stored within the scannable frames 102, 102', 102", 102'". Image scanning device 210 may be any such device, such as, but not limited to, a camera, an infrared camera, a thermal imaging camera, a video image scanning device, a digital camera, a 3D camera, and the like. In some embodiments, the image scanning device 210 may include a 3D image scanning device, such as a time of flight image scanning device or structured light image scanning device, which may include any of those various embodiments developed or produced by Optima NV, Witherenstraat 4-1040 Brussels, Belgium; Prime Sense, 28 Habarzel St., $4^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA. The image scanning device 210 may include a flash, which may be used to illuminate the subjects in the image. In preferred embodiments, the image scanning device 210 may include a field of view that encompasses a significant portion of the environment and may be programmed to scan the wristband 100 as the wearer of the wristband 100 approaches within a certain proximity of the image scanning device 210.

System 200 further comprises of at least one computer processor 202, electronically connected to a non-transitory computer readable medium 204, wherein the at least one computer processor 202 includes computer executable instructions 206 readable and executable by the at least one computer processor 202 and is configured for launching a security application program 208, programmed for performing any one or more of the following: receiving wearer's identification information 106 for wearer; receiving identification information 106 for wearer; retrieving registered information 124 for site access area being accessed; assigning an appropriate security clearance 108 for wearer based on the retrieved registered information 124; and storing security clearance 108 as embedded interactive multimedia content within at least one scannable frame 102 on a wearable security device's exterior 104 for retrieval when an image scanning device 210 scans the one or more scannable frames 102, 102', 102" that includes at least one hot corner with at least one hyperlink or icon embedded within, while wearer is moving and retrieves the security clearance 108's embedded interactive multimedia content for ascertaining and controlling wearer's access to site access area, and wherein the embedded interactive multimedia content stored thereon is remotely swappable providing for remote updating of the current interactive multimedia content for wearer's security clearance 108 with updated security clearance 108 and swapping the current embedded interactive multimedia content with the updated security clearance 108 that is stored within the one or more scannable frames 102, 102', 102" on the wearable security device's exterior 104 without requiring wearer to remove, or replace the physical wearable security device, breaking stride for reissuance or change in wearer's security clearance 108 and approving issuance of the wearable security device 100 to the wearer.

The at least one computer processor 202 as described herein may be any kind of processor, including, but not limited to, a central processing unit (CPU), a microprocessor, a video processor, a front end processor, a coprocessor, a single-core processor, a multi-core processor, as well as any known computer processor 202 that's used in the arts.

Processor 202 includes computer executable instructions 206 that may be loaded directly thereon, or may be stored on a non-transitory computer readable medium 204 (e.g. memory means 204), which is electronically connected to the at least one computer processor 202. Memory means 204 includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. In some embodiments, memory means 204 may be embedded within at least one processor 108 where the information stored therein is encrypted for privacy purposes. The visitor identification information 106, registered information (e.g. patient/employee/hospital and/or building information, security clearance and the like may be stored on the memory means 204 where the information stored thereon is retrieved using the computer executable instructions 206.

The terms "electronically connected," "electronic connection," and the like, as used throughout the present disclosure, are intended to describe any kind of electronic connection or electronic communication, such as, but not limited to, a physically connected or wired electronic connection and/or a wireless electronic connection using for example at least one connecting means 208.

In some embodiments, the at least one connecting means 214 may be any kind of means, such as a video connector, a coaxial cable, an HDMI cable, an s-video component connector, a Wi-Fi video transceiver, a Bluetooth video transceiver, an internal video cable socket, a DVI connector, and the like.

The computer executable instructions 206 may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions 206 may include image recognition software and/or firmware, which may be used to analyze the images 206, 206' captured in the image scanning device's 204 field of view and to validate the wearer's security clearance 108 for that site access area stored on the wristband as embedded interactive multimedia content. Such image recognition software may include facial recognition software, or may simply include general object recognition software. The terms "object recognition software," "facial recognition software," and "image recognition software," as used throughout the present disclosure, may refer to the various embodiments of object recognition software known in the art, including, but not limited to, those embodiments described in the following publications: *Reliable Face Recognition Methods: System Design, Implementation, and Evaluation*, by Harry Wechsler, Copyright 2007, Published by Springer, ISBN-13: 978-0-387-22372-8*; Biometric Technologies and Verification Systems*, by John Vacca, Copyright 2007, Elsevier, Inc., Published by Butterworth-Heinemann, ISBN-13: 978-0-7506-7967-1; and Image *Analysis and Recognition*, edited by Aurelio Campilho and Mohamed Kamel, Copyright 2008, Published by Springer, ISBN-13: 978-3-540-69811-1, *Eye Tracking Methodology: Theory and Practice*, by Andrew T. Duchowski, Copyright 2007, Published by Springer, ISBN 978-1-84628-608-7, all of which are herein incorporated by reference. In one embodiment, the object recognition software may comprise 3D image scanning device middleware, which may include 3D gesture control and/or object recognition middle ware, such as those various embodiments produced and developed by Softkinetic S.A., 24 Avenue L. Mommaerts, Brussels, B-1140, Belgium, Microsoft Corp., One Microsoft Way, Redmond, Wash., USA, and Omek Interactive, 2 Hahar Street, Industrial Zone Har Tuv A, Ganir Center Beith Shemesh 99067, Israel.

The security application program 208 may comprise in part of a browser, such as for use on a personal computer or similar browsing device and comprises of computer executable instructions 206' executable by the computer's at least one processor 202', and operative to perform the system 200 and methods disclosed herein. Computer executable instructions 206 may be loaded directly on the computer's processor 202', or may be stored in computer's storage means 218, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 206 may be any type of computer executable instructions, which may be in the form of a computer program, the program being composed in any suitable programming language or source code, such as C++, C, JAVA, JavaScript, HTML, XML, and other programming languages.

In some embodiments, the scannable frames 102, 102', 102" may be presented on the wristband 100 as with printed images, e.g. patient number 104, visitor's identification number or image or hospital number. In some embodiments, some or all of the information stored in the scannable frames 102, 102', 102" may not be visible as it is embedded and not viewable on the wristband 100. The security application program 208 is programmed for receiving wearer's identification information 106 for wearer that may be entered through input means using the security application program's 208 graphical user interface. In order to determine the appropriate security clearance, system 200 will need the patient's/employee's/building information so that it may retrieve the registered information 124 to allocate the appropriate security clearance 208 for site access area being accessed.

The security application program 208 is also configured for assigning an appropriate security clearance 108 for wearer based on the retrieved registered information 124. In some instances the wearer's identity is also a factor taken into consideration, e.g. a policeman visiting the patient may need broader access in comparison to other visitors. Security application program 208 is further configured for storing security clearance 108 as embedded interactive multimedia content within at least one scannable frame 102 on a wearable security device's exterior 104 for retrieval when an image scanning device 210 scans the one or more scannable frames 102, 102', 102" that includes at least one hot corner with at least one hyperlink or icon embedded within, while wearer is moving and retrieves the security clearance 108's embedded interactive multimedia content for ascertaining and controlling wearer's access to site access area, and wherein the embedded interactive multimedia content stored thereon is remotely swappable providing for remote updating of the current interactive multimedia content for wearer's security clearance 108 with updated security clearance 108 and swapping the current embedded interactive multimedia content with the updated security clearance 108 that is stored within the one or more scannable frames 102, 102', 102" on the wearable security device's exterior 104 without requiring wearer to remove, or replace the physical wearable security device, breaking stride for reissuance or change in wearer's security clearance 108 and approving issuance of the wearable security device 100 to the wearer.

In some embodiments, system 200 may further comprise input means 218, which in some embodiments, may be any type of means, including, but not limited to: a telephone modem: a key pad, a key board, a remote control, a touch screen, a virtual keyboard, a mouse, a stylus, a microphone, a camera, a fingerprint scanner, and a retinal scanner. In the embodiment shown, input means 218 comprises a key board connected to a display device 218 connected to the at least one processor 202 such that security clearance 108 may be determined and assigned to the wristband 100 being issued to the wearer. The display device 218 may be any kind of display device, such as, but not limited to, a television, a computer monitor, a projector, or any other kind of screen and/or display device 218.

In some embodiments the image scanning device 204 is controlled by the security application program 208 where they are in electronic communication with each other such that when a scannable frame 102 is scanned by the image scanning device 204 the security application program 208 activates the embedded hyperlink(s) or icon(s) in the hot corners 110, 112, 114, 116 of the scannable frame 102 and they are visibly displayed on a linked display device 218 where the security clearance 108 can be reviewed, controlled and or swapped using the visible icons that have corresponding hyperlinks or control commands associated with them to control the security clearance 108 information. Because the security clearance 108 is embedded the wearer has no assuredness of precisely what information is stored on the wristband 100, which minimizes his/her ability to tampering with the apparatus 100, system 200 and the security clearance 108 stored thereon. If the scanned security clearance 108 matches the authorized site access area then the access to entrances and/or exit doors can be controlled to provide access appropriate for the security clearance 108. If not, the entrance and/or exit doors will remain locked and refuse to open. In some embodiments, a covert alarm is issued and an intercom system can be activated for questioning the individual and/or directing the individual to areas where he/she is authorized to access.

In some embodiments, the security application program 208 is further configured for comparing a present image of wearer as scanned by the image scanning means 210 with the wearer's identification information 106 scanned from the scannable frame 102 that is stored as a part of the security clearance 108 as embedded interactive multimedia content with the security application program 208 determining whether the wearer is authorized to be in present site access area. The security application program 208 may be further configured for controlling access to electronic doors based on the assigned access information scanned at or near entrances and exits when the wearer is within a predetermined proximity to the image scanning device 210. Controlling access to electronic doors may include automatically opening doors once wearer is within a predefined proximity (e.g. 8 feet, 6 feet, etc.) to the door; issuing an alarm once it is determined that wearer is not authorized for present location; or confining wearer to present location by locking access doors and windows.

In some embodiments, the image scanning device 204 includes a GPS transponder that provides location information to the system 200, such that the individual's location is identified by the location of the image scanning device 204. In some embodiments, each image scanning device 204 has an identifiable number 226 (not shown) that it readily identifies its location to the system 200 an ultimately the wristband wearer. In an exemplary embodiment, if the image feed is being provided by image scanning device #182, system is alerted that the individual wearing/in possession of the wristband 100 is approaching WARD ABC.

In a further embodiment, system 200 comprises at least one communication means 220 for communication with a local device, wherein the communication means 220 may be electronically connected to the at least one processor 102. In some embodiments, such communication means 220 may include a Bluetooth™ module, a USB™ port, an infrared port, a network adapter, such as a Wi-Fi™ (WLAN) card, and the like. The local device may be any kind of device, such as a television, a computer, a remote control, a telephone, a portable digital assistant, and the like. In the preferred embodiment, local device is a computer, e.g. a network enabled computer, i.e. a laptop or personal digital assistant subject to wired/wireless connectivity.

In yet another embodiment, system 100 further comprises at least one communication means 220 for communicating with a remote station, wherein the at least one communication means 220 may be electronically connected to the at least one processor 102. In some embodiments, the at least one communication means 220 may be any kind of means, such as, but not limited to, a wireless modem, such as a GSM modem, a wired modem, an Ethernet adapter, a Wi-Fi adapter, and the like. In some embodiments, the remote station may be a service provider, such as, but not limited to, remote security monitoring service provider, a server computer, and the like. In such embodiments, the computer executable instructions 206 may be further operative to use the at least one communication means 220 with a remote station to transmit or receive information to or from the remote station.

In some embodiments, image scanning devices 210, 210' are positioned at or near access points, i.e. entrance and exit doors. In an exemplary embodiment, as the wearer approaches an entranceway, which includes a corresponding image scanning device 210 at that location, the image scanning device 210 scans the scannable frames 102, 102', 102" on the wristband 100. By scanning the scannable frames 102, 102', 102", the image scanning device 210 captures an image 206 of the scannable frame 102 with embedded information not viewable until displayed on the display device 218 by the security application software program 208.

Methods

Figure 3:
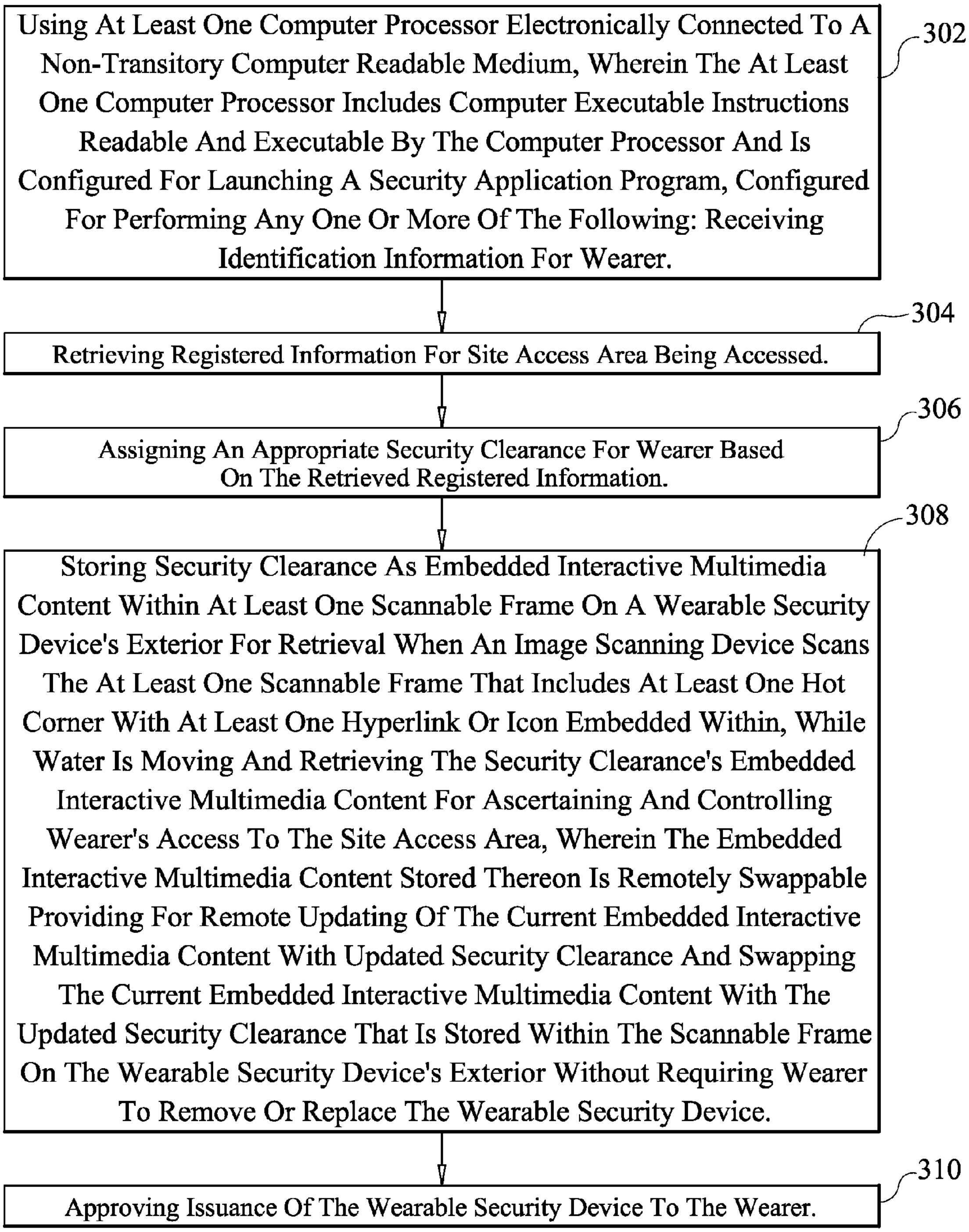
FIG. 3 shows an example of an exemplary method according to one embodiment of the invention.

FIG. 3 shows an example of an exemplary method 300 according to one embodiment of the invention. Method 300 comprises of using at least one computer processor 202, electronically connected to a non-transitory computer readable medium 204, wherein the at least one computer processor 202 includes computer executable instructions 206 readable and executable by the at least one computer processor 202 and is configured for launching a security application program 208, programmed for performing any one or more of the following: receiving wearer's identification information 106 for wearer (step 302). Such wearer's identification information 106 may include but is not limited to any one or more of the following: wearer's photograph or image, name, address, driver's license number, age, relationship to patient, or any other identification information and the like. In some embodiments the wearer's photograph or image may be used for remote validation if the wearer is noted to be in for example a site access area that authorization of the wearer is at issue, where a comparison can be made using the extracted multimedia content with the visual of the wearer.

Method 300 further comprises of retrieving registered information 210 for a site access area being accessed (step 302). The registered information may be related to patient or employee and/or building information so that the wearer's security clearance 108 can be appropriately assigned. Method 300 further comprises assigning an appropriate security clearance 108 for wearer based on the retrieved registered information 210 to determine which public or proprietary site access areas the wearer will be authorized to traverse. In some embodiments, the wearable security device 100 may be issued also to employees, e.g. doctors, nurses or other health care professionals and as such in assigning the appropriate security clearance 108 method 300 also takes into consideration the wearer's identification information 106.

Method 300 further comprises storing security clearance 108 as embedded interactive multimedia content within at least one scannable frame 102 on a wearable security device's exterior 104 for retrieval when an image scanning device scans the one or more scannable frames 102, 102', 102" that includes at least one hot corner with at least one hyperlink or icon embedded within, while wearer is moving and retrieves the security clearance 108's embedded interactive multimedia content for ascertaining and controlling wearer's access to site access area, and wherein the embedded interactive multimedia content stored thereon is remotely swappable providing for remote updating of the current interactive multimedia content for wearer's security clearance 108 with updated security clearance 108 and swapping the current embedded interactive multimedia content with the updated security clearance 108 that is stored within the one or more scannable frames 102, 102', 102" on the wearable security device's exterior 104 without requiring wearer to remove, or replace the physical wearable security device, breaking stride for reissuance or change in wearer's security clearance 108 (step 306).

In this manner if wearer is presently located in a site access area that he/she is denied access in error but should've been authorized for egress and ingress to the site access area, the wearer's security clearance 108 may be scanned, reviewed, updated and swapped without the wearer having to for instance change location, return to the security desk to update his or her security clearance 108 or replace the wristband 100 to gain access to the site access area that he/she was restricted from entering or exiting. The process of swapping the wearer's security clearance 108 may be entirely seamless to the wearer, and even without his/her knowledge and/or stopping to break their stride as the swapping of the information stored within the scannable frames 102, 102', 102", e.g. updating the security clearance 108 is happening remotely.

Similarly, if the security access needs to be more restrictive, e.g. post issuance of the wearable security device 100, e.g. the wearer is identified as being dangerous, the security clearance 108 may be remotely adjusted to be more restrictive allowing for the wearer to be confined to their present location. Method 300 further comprises approving issuance of wearable security device 100 to the wearer (step 308). Once the wearer receives the wristband 100, wearer is free to move within the designated authorized site access areas appropriate for his/her security clearance 108.

In some embodiments, the wearable security device 100 includes a visible image displayed within the scannable frame 102, 102', while in other embodiments no images are included. Method 300 further comprises authenticating the wearer's security clearance 108 based on the embedded interactive multimedia content retrieved by the image scanning device 110. Such multimedia content may be displayed in any one or more of the following formats: video, text, graphics, and audio, or any combination thereof. The embedded interactive multimedia content may include for example the wearer's identification information, e.g. visitors photograph or image, name, address, driver's license number, age, relationship to patient, registration information, i.e. building, employee or patient information or any other identification information.

In some embodiments, method 300 comprises of comparing for example the wearer's photograph with the image portrayed on any security camera in the site access areas. If, for example these images differ access to and from a particular site access area may be controlled by closing a door, opening a door and the like.

Method 300 further comprises controlling the wearer's security clearance 108 by utilizing at least one control command associated with the at least one hyperlink or icon embedded within the scannable frame 102, with full functionality for review and control of the multimedia content when displayed. Control commands may include but are not limited to any one or more of the following: play, stop, fast-forward, rewind, pause, maximize viewing, minimize, end and cancel; retrieve images, display media content, link to one or more electronic address, and the like. In some embodiments the embedded hyperlinks or icon links to a website using a designated URL, and the like to retrieve a plurality of multimedia content.

Method 300 further comprises remotely swapping the current embedded interactive multimedia content (stored within the scannable frame on the wearer's wristband 100) with the updated security clearance 108 that is stored within the scannable frame on the wearable security device's exterior 104 without requiring wearer to remove, or replace the physical wearable security device, breaking stride for reissuance or change in wearer's security clearance 108. As previously mentioned this can occur quite seamlessly without requiring the wearer to stop at a particular image scanner to update the security clearance 108.

Figure 4:
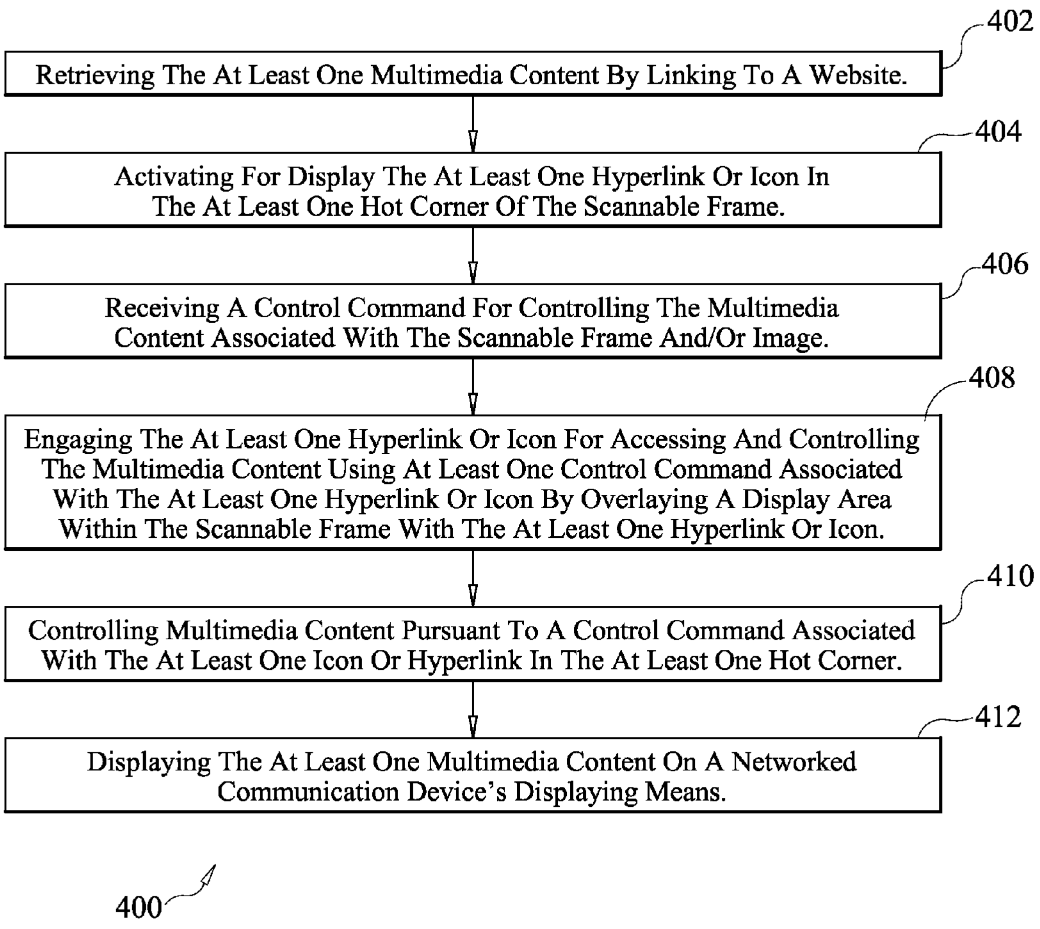
FIG. 4 shows an example of an exemplary method according to one embodiment of the invention.

FIG. 4 shows an example of an exemplary method 400 according to one embodiment of the invention. Method 400 comprises of using at least one computer processor 202, electronically connected to a non-transitory computer readable medium 204, wherein the at least one computer processor 202 includes computer executable instructions 206 readable and executable by the at least one computer processor 202 and is configured for launching a security application program 208, programmed for performing any one or more of the following: retrieving the at least one multimedia content by linking to a website or a Uniform Resource Locator (URL) address (step 402) and the like to obtain for example security clearance 108, identification information and the like.

Method 400 further comprises the security application program 208, programmed for activating for display the at least one hyperlink or icon in the at least one hot corner of the scannable frame 102 (step 404); receiving a control command for controlling the multimedia content associated with the scannable frame 102 and/or image (step 406); engaging the at least one hyperlink or icon for accessing and controlling the multimedia content using at least one control command associated with the at least one hyperlink or icon by overlaying a display area 117 within the scannable frame with the at least one hyperlink or icon (step 408); controlling multimedia content pursuant to a control command associated with the at least one icon or hyperlink in the at least one hot corner (step 410); and displaying the at least one multimedia content on a networked communication device's displaying means (step 412). In some embodiments, the at least one multimedia content is displayed within the scannable frame 102, 102' with full functionality for review and control using the control command.

Hardware and Operating Environment

This section provides an overview of exemplary hardware and the operating environments in conjunction with which embodiments of the inventive subject matter can be implemented.

A software program may be launched from a non-transitory computer readable medium in a computer-based system 200 to execute the functions defined in the software program. Various programming languages may be employed to create software programs designed to implement and perform the methods 300 & 400 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
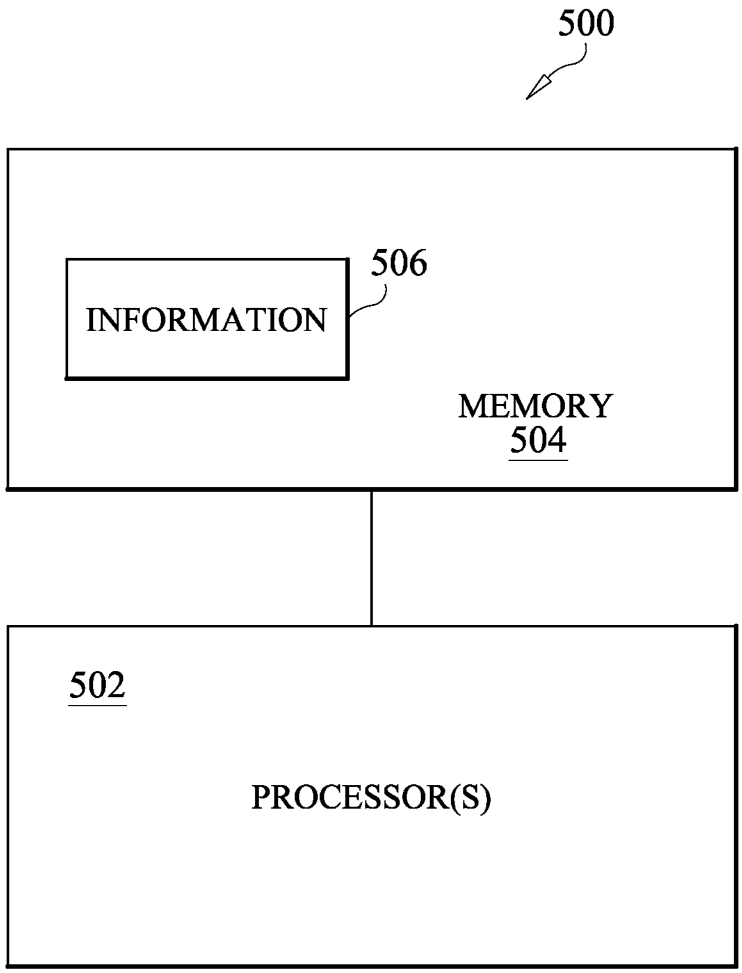
FIG. 5 is a block diagram representing an apparatus according to various embodiments.

FIG. 5 is a block diagram representing an apparatus 100 according to various embodiments. Such embodiments may comprise a computer; a memory means 502, a magnetic or optical disk, some other storage device, or any type of electronic device or system. The apparatus 500 may include one or more processor(s) 504 coupled to a non-transitory machine-accessible medium such as memory means 502 (e.g., a memory including electrical, optical, or electromagnetic elements). The medium may contain associated information 506 (e.g., computer program instructions, data, or both) which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. An apparatus comprising of:

a wearable security device that includes at least one scannable frame displayed on the wearable security device's exterior, wherein a wearer's identification information and assigned security clearance for access to varied site access areas is stored as interactive multimedia content within the at least one scannable frame that includes at least one hyperlink or icon embedded within, for which the security clearance is verifiable and controllable when the at least one scannable frame is scanned by at least one image scanning device, activating the embedded at least one hyperlink or icon and the activated at least one icon becomes visibly displayed, and the security clearance is enabled for control by control commands associated with the activated visible icon.

2. The apparatus of claim 1, wherein the at least one media content comprises of any one or more of the following: text, pictorial, video, audio, or graphics.

3. The apparatus of claim 1, wherein the security clearance comprises of any one or more of the following: wearer's identification information and registered information.

4. The apparatus of claim 1, wherein the security clearance is swappable as the current embedded interactive multimedia content can be replaced with the updated security clearance that is stored within the scannable frame on the wearable security device's exterior without requiring wearer to remove or replace the wearable security device.

5. The apparatus of claim 1, wherein the the scannable frame includes at least one hot corner.

6. A system comprising of:

a wearable security device that includes at least one scannable frame displayed on the wearable security device's exterior, wherein a wearer's identification information and assigned security clearance for access to varied site access areas is stored as interactive multimedia content within the at least one scannable frame that includes at least one hyperlink or icon embedded within, for which the security clearance is verifiable and controllable when the at least one scannable frame is scanned by at least one image scanning device, activating the embedded at least one hyperlink or icon and the activated at least one icon becomes visibly displayed, with the security clearance enabled for control by control commands associated with the activated visible icon; and at least one computer processor, electronically connected to a non-transitory computer readable medium, wherein the at least one computer processor includes computer executable instructions readable and executable by the computer processor and is configured for launching a security application program, programmed for enabling remote updating of the stored interactive multimedia content with updated security clearance without requiring wearer to remove or replace the wearable security device.

7. The system of claim 6, wherein the security application program is further configured for performing any one or more of the following:

receiving identification information for wearer;

retrieving registered information for site access area being accessed;

assigning an appropriate security clearance for wearer based on the retrieved registered information;

storing security clearance as embedded interactive multimedia content within at least one scannable frame on a wearable security device's exterior;

retrieving the security clearance's embedded interactive multimedia content for ascertaining and controlling wearer's access to the site access area, wherein the embedded interactive multimedia content stored thereon is remotely swappable providing for remote updating; or approving issuance of the wearable security device to the wearer.

8. The system of claim 6, wherein the security clearance comprises of any one or more of the following: wearer's identification information and registered information.

9. The system of claim 6, wherein the security clearance is swappable as the current embedded interactive multimedia content can be replaced with the updated security clearance that is stored within the scannable frame on the wearable security device's exterior without requiring wearer to remove or replace the wearable security device.

10. The system of claim 6, further comprising retrieving registration information for determining the appropriate site access areas for the wearer's assigned security clearance.

11. The system of claim 6, further comprising the security application program configured for comparing a present image of wearer with the wearer's identification information scanned from the scannable frame and determining whether the wearer is authorized to be in present site access area.

12. The system of claim 6, further comprising controlling access to electronic doors based on the assigned access information scanned at or near entrances and exits when the wearer is within a predetermined proximity to the image scanning device.

13. The system of claim 6, wherein controlling access to electronic doors further comprises automatically opening doors once wearer is within a predefined proximity to the door; issuing an alarm once it is determined that wearer is not authorized for present location; or confining wearer to present location by locking access doors and windows.

14. A method comprising:

using at least one computer processor, electronically connected to a non-transitory computer readable medium, wherein the at least one computer processor includes computer executable instructions readable and executable by the computer processor and is configured for launching a security application program, configured for performing any one or more of the following:

storing security clearance for access to varied site access areas as embedded interactive multimedia content within at least one scannable frame that includes at least one hyperlink or icon embedded within, on a wearable security device's exterior;

activating the embedded at least one hyperlink or icon when the at least one scannable frame is scanned by at least one image sensing device, and the activated at least one icon becomes visibly displayed, and the security clearance is enabled for control by control commands associated with the activated visible icon; and remote updating of the stored interactive multimedia content with updated security clearance without requiring wearer to remove or replace the wearable security device.

15. The method of claim 14, further comprising authenticating the wearer's security clearance based on the interactive multimedia content retrieved by the image scanning device.

16. The method of claim 14, wherein the interactive multimedia content may be displayed in any one or more of the following formats: video, text, graphics, and audio.

17. The method of claim 14, further comprises controlling the wearer's security clearance by utilizing at least one control command associated with the at least one hyperlink or the activated visible icon.

18. The method of claim 14, further comprising remotely swapping the current embedded interactive multimedia content with the updated security clearance that is stored within the scannable frame on the wearable security device's exterior without requiring wearer to remove or replace the wearable security device.

19. The method of claim 14, wherein the security application program is further configured for performing any one or more of the following:

retrieving the at least one multimedia content by linking to a website receiving identification information for wearer;

retrieving registered information for site access area being accessed;

assigning an appropriate security clearance for wearer based on the retrieved registered information;

approving issuance of the wearable security device to the wearer;

receiving a control command for controlling the multimedia content associated with the scannable frame and/or image;

engaging the at least one hyperlink or icon for accessing or controlling the multimedia content using at least one control command associated with the at least one hyperlink or icon by overlaying a display area within the scannable frame with the at least one visible icon;

controlling multimedia content pursuant to a control command associated with the at least one icon or hyperlink in the at least one hot corner; or displaying the at least one multimedia content on a networked communication device's displaying means.

20. The method of claim 14, wherein the wearable security device further comprises an image displayed within the scannable frame.

21. The method of claim 14, wherein the security application program is further configured for displaying the at least one multimedia content within the scannable frame with full functionality for review and control using control commands.

* * * * *